J. M. ACKERSON.
Sled Brake.
No. 84,526. 
Patented Dec. 1, 1868.
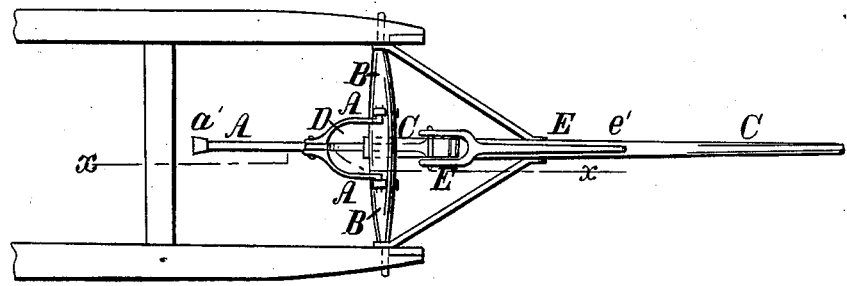
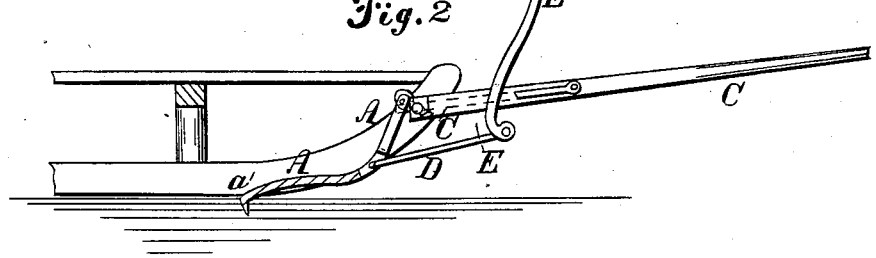
Witnesses:
Inventor:
J. M. Ackerson

JAMES M. ACKERSON, OF LA FAYETTE, NEW JERSEY.

Letters Patent No. 84,526, dated December 1, 1868.

IMPROVED SLED-BRAKE.

The Schedule referred to in these Letters Patent and making part of the same.

*To all whom it may concern:*

Be it known that I, JAMES M. ACKERSON, of La Fayette, in the county of Sussex, and State of New Jersey, have invented a new and improved Sled-Brake; and I do hereby declare that the following is a full, clear, and exact description thereof, which will enable others skilled in the art to make and use the same, reference being had to the accompanying drawing, forming part of this specification, in which—

Figure 1 is a top view of the forward part of a sled to which my improved brake has been attached.

Figure 2 is a detail sectional view of the same, taken through the line $x\ x$, fig. 1.

Similar letters of reference indicate like parts.

My invention has for its object to furnish an improved brake for attachment to sleds, sleighs, &c., which shall be simple in construction, readily attached, and conveniently operated, and which shall be so constructed and arranged that it may be used with equal facility for braking the sled when ascending and when descending a hill; and It consists in the construction and combination of the various parts of the brake, as hereinafter more fully described.

A is the lever-dog, the rear end of which is made with a downwardly-projecting hook or prong, $a'$, which, in applying the brake, is forced down into the roadway, and thus retards or checks the movement of the sled.

The forward part of the lever-dog A is made branched or forked, and is pivoted to the roller B, of the sled-tongue C, by means of eye-bolts, or other suitable bearings.

In the angle of the lever-dog A is pivoted the rear end of the connecting-rod D, which passes beneath the roller B, and the forward end of which is pivoted to and within the lower or forked end of the lever E.

E is the operating-lever, the lower end of which is made forked or branched, to receive the tongue C. The lever E is pivoted to an eye-plate, or other suitable support, attached to the rear part of the tongue C.

The upper or free end of the lever E should be made sufficiently heavy to hold the dog-lever A away from the ground by its own weight, and upon it should be formed or to it should be attached an eye or ring, $e'$, to receive the end of a strap or cord, which should extend back to the sled, so that it may be conveniently reached to operate the brake by the driver from his seat.

By this construction, by drawing the upper end of the lever E rearward, the hook or prong $a'$, of the lever-dog A, will be forced downward, so as to take hold of the roadway and retard or stop the motion of the sled, according to the amount of force applied, whether said sled may be moving upon a level, or up or down an inclination.

It should be observed that the various parts of the brake are so arranged that the brake-dog may operate upon the middle part of the roadway, so as not to tear up the tracks along which the runners move.

Having thus described my invention,

I claim as new, and desire to secure by Letters Patent—

The combination of the lever-dog A, connecting-rod D, and operating-lever E, said parts being constructed, arranged, and operating substantially as herein shown and described, and for the purpose set forth.

Witnesses:       JAMES M. ACKERSON.
  DAVID MONROE,
  O. P. ARMSTRONG.